Sept. 8, 1931.   V. BENDIX   1,822,687

BRAKE

Filed Dec. 3, 1927

INVENTOR
VINCENT BENDIX
BY
*Jno. W. McConkey*
ATTORNEY

Patented Sept. 8, 1931

1,822,687

UNITED STATES PATENT OFFICE

VINCENT BENDIX, OF CHICAGO, ILLINOIS, ASSIGNOR TO BENDIX BRAKE COMPANY, OF SOUTH BEND, INDIANA, A CORPORATION OF ILLINOIS

BRAKE

Application filed December 3, 1927. Serial No. 237,386.

This invention relates to brakes, and is illustrated as embodied in an internal expanding automobile brake.

An object of the invention is to arrange the brake so that there are no projecting parts to interfere with adjacent portions of the chassis, or to be bent or damaged by engagement therewith. Preferably the anchor, and the shoe-positioning means, which comprise the usual projecting parts of the brake, are arranged entirely within the brake drum, the backing plate being pressed or drawn to form bosses projecting into the drum and carrying the anchor and the shoe-positioning means. When regarded from the exterior of the backing plate, these bosses form depressions in which are arranged the clamping nuts, or equivalent parts, of the anchor and of the shoe-positioning means. Thus all of these parts terminate short of the plane of the backing plate, leaving the exterior of the brake entirely clear of projecting parts.

The above and other objects and features of the invention, including various novel and desirable details of construction, will be apparent from the following description of one illustrative embodiment shown in the accompanying drawings, in which.

Figure 1:
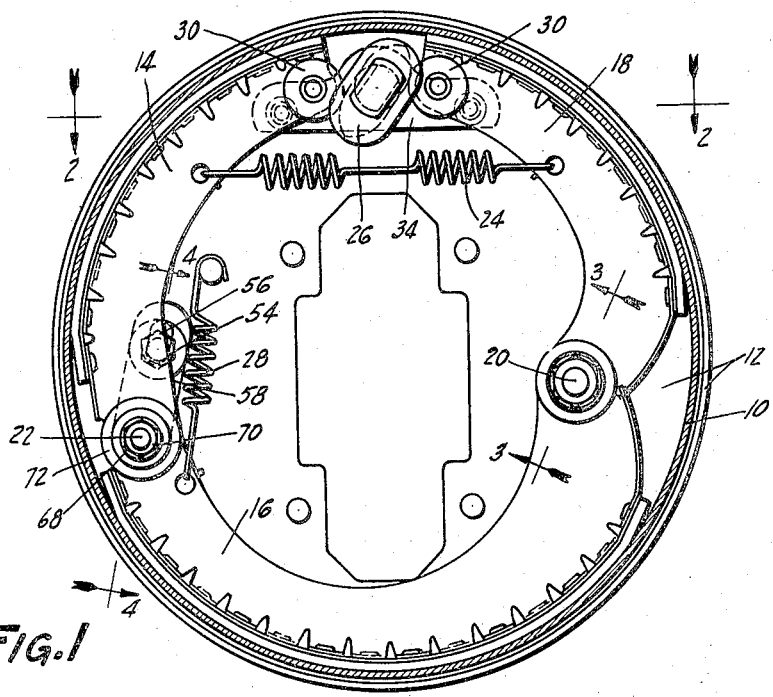
Figure 1 is a vertical section through the brake, just inside the head of the brake drum, and showing the brake shoes in side elevation.
Figure 2:
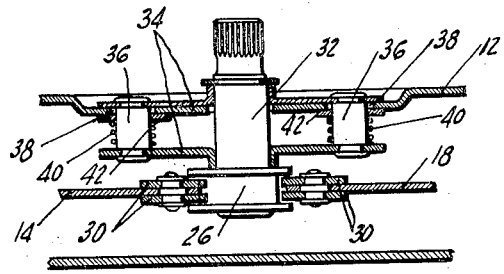
Figure 2 is a partial section, through the applying means of the brake, on the line 2—2 of Figure 1.
Figure 3:
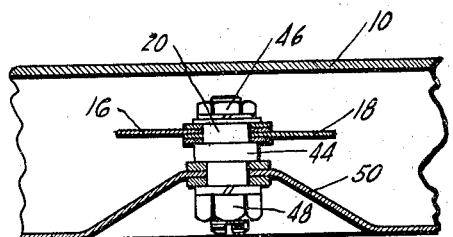
Figure 3 is a partial section through the brake anchor, on the line 3—3 of Figure 1.
Figure 4:
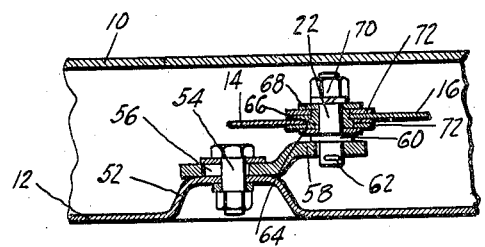
Figure 4 is a partial section through the shoe-positioning means, on the line 4—4 of Figure 1.

In the arrangement selected for illustration, the brake includes a drum 10, at the open side of which is a support such as a backing plate 12, and within which is arranged the brake friction means, shown as comprising three brake shoes 14, 16, and 18. Shoes 16 and 18 are anchored on a fixed pivot 20, while shoe 14 is connected to shoe 16 by a floating pivot 22. The shoes 14 and 18 are spread apart to apply the brake, against the resistance of a return spring 24, by means such as a cam 26, while shoe 16 is applied by shoe 14 against the resistance of an auxiliary return spring 28.

Shoes 14 and 18 may, if desired, be provided with pairs of rollers 30 engaging the cam 26. Cam 26 is shown formed integrally with a shaft 32 journaled in bearings formed in two plates 34 held spaced apart by posts 36. In order to permit the cam to shift to center itself, posts 36 pass through relatively large openings 38 in the backing plate 12, and are provided with coil springs 40 sleeved on the posts and confined between the inner plate 34 and friction washers 42.

Anchor 20 is formed with a collar 44, co-operating with a nut 46 threaded on a reduced-diameter portion of the anchor to hold the shoes, and which also co-operates with a nut 48 threaded on the other end of the anchor to secure the anchor to the backing plate 12. According to an important feature of the invention, backing plate 12 is drawn inwardly of the drum to form what may be regarded as a boss 50 projecting into the drum and carrying the anchor 20, thus making the overhang of the anchor as short as possible. Regarding the outside of the backing plate, this construction may be regarded as providing a depression for nut 48 and for the end of anchor 20 which projects through the plate, so that the entire anchor is within the drum,—i. e., no part of it projects past the plane of the backing plate.

A similar boss or depression 52 is drawn in the plate adjacent the floating pivot 22, to receive certain parts of novel shoe-positioning means fully disclosed in an application filed by Adiel Y. Dodge, October 4, 1926, Serial No. 139,389. This means included a clamping bolt 54 passing through the backing plate into the depression 52, and passing through a slot 56 in a positioning plate 58 and frictionally clamping the plate 58 to the backing plate 12. Plate 58 has an opening at its other end to receive the end of pivot 22, being confined between a collar 60 on the pivot and a cotter-pin 62 in the end of the pivot, this opening being larger than pivot 22 by an amount equal to the distance the pivot should move during the movement of shoe 16 from applied to released position.

When the brake is applied, pivot 22 moves in the opening in plate 58 and, if the brake has worn, it may shift the plate 58 slightly against the resistance of bolt 54. When the brake is released again, spring 28 moves shoe 16 to a released position determined by engagement of pivot 22 with the opposite side of its opening in plate 58.

Pivot 22 is provided with a washer 64, on which rests a bushing 66 through which the pivot passes, and with another washer 68 held against the end of bushing 66 by a nut 70 threaded on the end of the pivot. The ends of shoes 14 and 16, to which washers 72 are shown welded to increase the bearing surface, are sleeved on the bushing 66, which is shown with a large-diameter portion on which shoe 14 is pivoted and with a smaller-diameter portion on which shoe 16 is pivoted.

While one illustrative embodiment has been described in detail, it is not my intention to limit the scope of the invention to that particular embodiment or otherwise than by the terms of the appended claims.

I claim:

1. A brake comprising, in combination, a drum, friction means within the drum, an anchor for the friction means, and a backing plate at the open side of the drum having a boss projecting within the drum and carrying said anchor and defining a depression on the exterior of the backing plate and being of such a depth that the anchor is arranged entirely within the drum.

2. A brake comprising, in combination, a drum, friction means within the drum, an anchor for the friction means, and a backing plate at the open side of the drum having a boss projecting within the drum and carrying said anchor and defining a depression on the exterior of the backing plate, the anchor having a part projecting through said boss into the depression and having a clamping part in said depression and terminating short of the plane of the backing plate.

3. A brake comprising, in combination, a drum, friction means within the drum, a positioning device for the friction means, and a backing plate at the open side of the drum having a boss projecting within the drum and carrying said device and defining a depression on the exterior of the backing plate and being of such a depth that said device is arranged entirely within the drum.

4. A brake comprising, in combination, a drum, friction means within the drum, a positioning device for the friction means, and a backing plate at the open side of the drum having a boss projecting within the drum and carrying said device and defining a depression on the exterior of the backing plate, said device having a part projecting through said boss into the depression and having a clamping part in said depression and terminating short of the plane of the backing plate.

5. A brake having, in combination with an operating shaft, a support having openings on opposite sides of the shaft, a pair of plates in which the shaft is journalled and which are on opposite sides of the support and the outer one of which rests against the support, posts fixedly spacing the plates apart and which pass through said openings, friction washers on the posts engaging the face of the support opposite the outer plate, and coil springs sleeved on the posts and confined between the washers and the inner plate.

In testimony whereof, I have hereunto signed my name.

VINCENT BENDIX.